United States Patent [19]

Love et al.

[11] Patent Number: 4,630,432
[45] Date of Patent: Dec. 23, 1986

[54] PICK-UP TINE ASSEMBLY FOR HARVESTER REELS

[75] Inventors: John E. Love; Archie E. Neal, both of Garfield; Scott Libby, Spokane, all of Wash.

[73] Assignee: J. E. Love Company, Garfield, Wash.

[21] Appl. No.: 714,624

[22] Filed: Mar. 21, 1985

[51] Int. Cl.[4] .......................................... A01D 57/02
[52] U.S. Cl. ........................................ 56/220; 56/400
[58] Field of Search ................. 56/219, 220, 221, 222, 56/223, 224, 225, 226, 227, 400

[56] References Cited

U.S. PATENT DOCUMENTS

| 2,317,127 | 4/1943 | Bowling | 56/219 |
|---|---|---|---|
| 2,432,653 | 12/1947 | Bloom | 56/400 |
| 3,026,667 | 3/1962 | Morrison et al. | 56/400 |
| 3,045,414 | 7/1962 | Scheidenheim | 56/400 |
| 3,626,678 | 12/1971 | Quam | 56/400 |
| 3,771,299 | 11/1973 | Gradwohl et al. | 56/220 |
| 3,796,030 | 3/1974 | Neal et al. | 56/220 |
| 4,459,797 | 7/1984 | Gessel et al. | 56/220 |

FOREIGN PATENT DOCUMENTS 627018  5/1963  Belgium ............................. 56/219

OTHER PUBLICATIONS

"The Grain Harvesters", by Quick and Buchele, published in 1978 by the American Society of Agricultural Engineers pp. 225-230.

Primary Examiner—Robert Peshock
Assistant Examiner—David I. Tarnoff
Attorney, Agent, or Firm—Wells, St. John & Roberts

[57] ABSTRACT

A metal tine assembly interchangeable with plastic tines on a transverse tubular bat having a teardrop cross-sectional configuration. Each tine includes a wound coil and upper shank clamped to the rear wall of a bat by an overlying bracket. The bracket has a lower opening that bears against the sides of the coil and an elongated recess with a side wall that bears against the tine shank to stabilize the tine on the bat. The assembly is held in place by a single mounting screw and expandable grommet.

11 Claims, 10 Drawing Figures

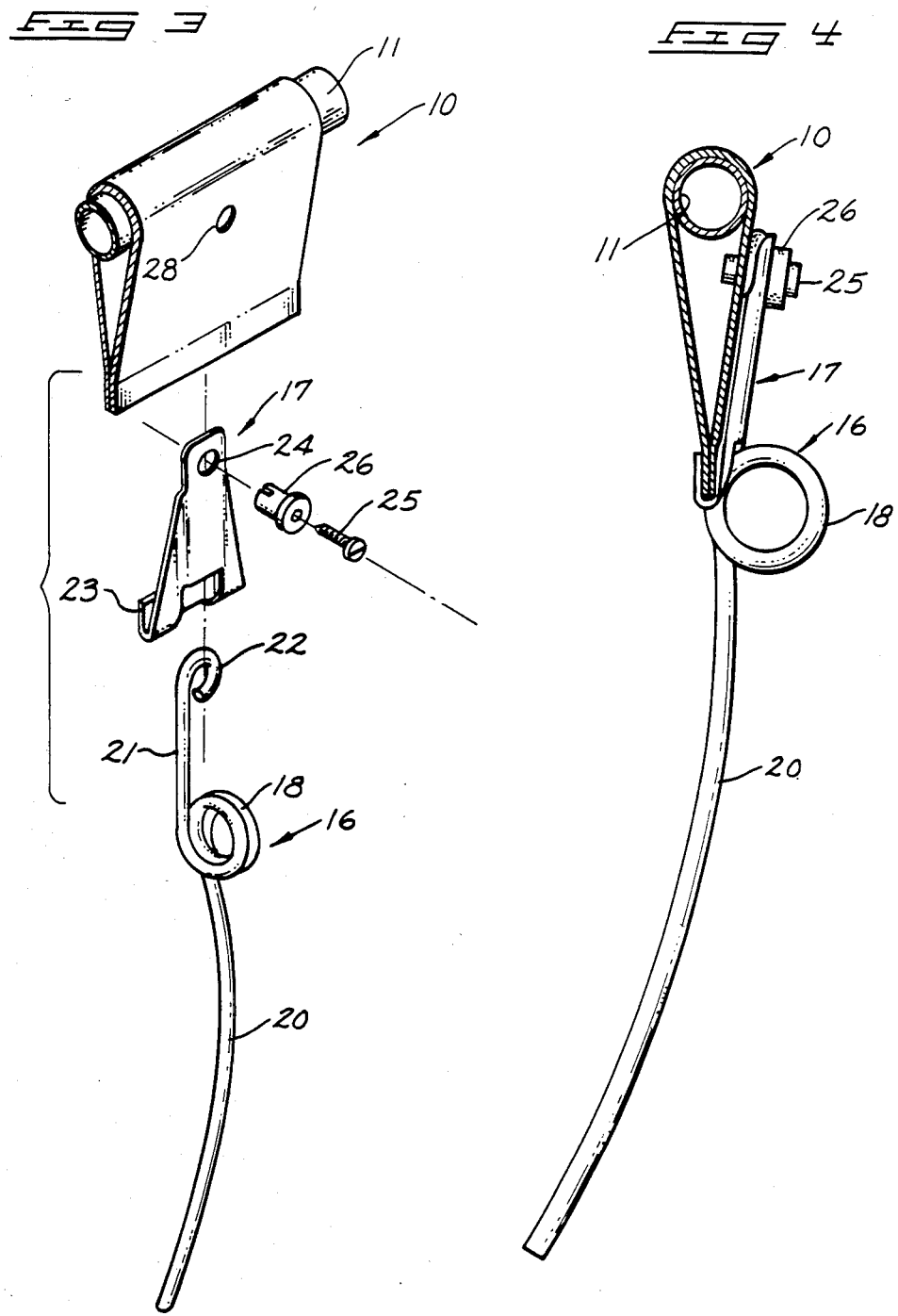

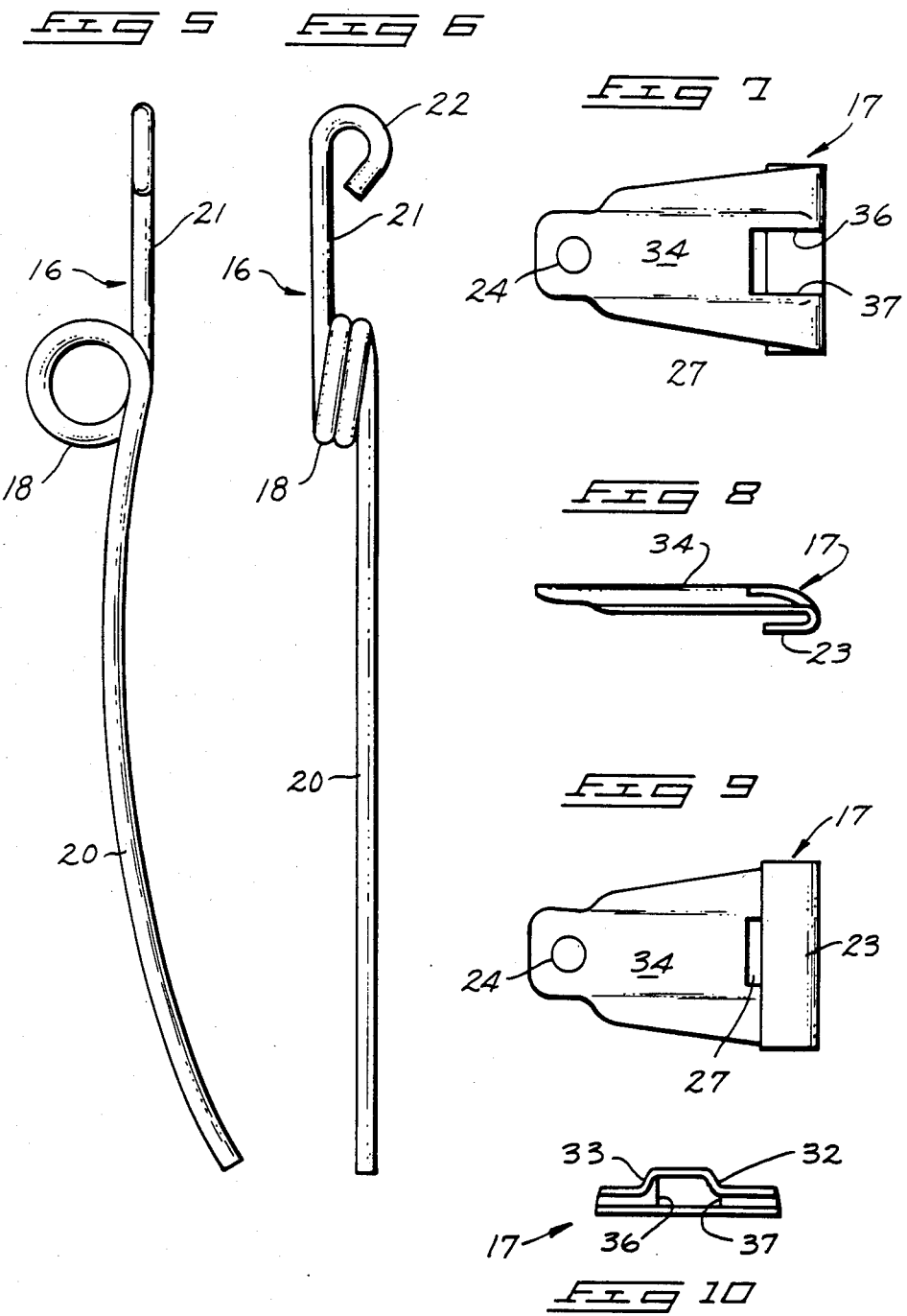

4,630,432

PICK-UP TINE ASSEMBLY FOR HARVESTER REELS

FIELD OF THE INVENTION

This disclosure relates to improvements in harvester pick-up tine assemblies mounted along transverse reel bats.

BACKGROUND OF THE INVENTION

Harvester reels extend transversely across a desired field path, and are rotated about a transverse axis to comb and support engaged plants as they are being cut. Such reels typically utilize elongated bats which are powered by an eccentric driving mechanism that maintains the bats in a substantially vertical attitude while the reel is rotated. An example of such a reel construction is shown in U.S. Pat. No. 3,771,299, issued Nov. 13, 1973. The bats shown in this prior patent are made from wood. They carry a plurality of metal pick-up tines having wound coils at their midsections.

In recent years, wood bats have been supplanted by hollow tubular bats, and metal tines have been at least partially replaced by plastic tines. Examples are detailed in U.S. Pat. No. 3,796,030, issued Mar. 12, 1974. The illustrated tubular bats have a hollow teardrop shape, with front and rear walls converging downwardly and abutting one another along their bottom edges. The plastic tines are typically mounted along the rear walls of the bats (in the direction of crop engagement). They are hooked under the bottom edge of the supporting bat.

Despite substantial improvements which have occurred in the design of plastic tines, there remain innumerable harvesting conditions which are best met by the use of metal tines, which have greater strength, durability, and bending properties than can be achieved in a plastic tine construction. This is particularly true where the tines are in ground contact. Such conditions can be encountered when harvesting wind blown crops such as peas or lentils, and when harvesting rice.

Many purchasers of modern harvester reels outfitted with plastic tines have found the reel to be unsatisfactory simply because of the limitations of the plastic tines themselves. Prior to the present improvements, it was then necessary to modify the entire bat structure in order to utilize metal tines on such reels. The present improvement permits retrofitting of a tubular reel with metal tines if plastic tines should prove unsatisfactory in actual practice. It also permits metal tines and plastic tines to be used interchangeably. Metal tines can be located at the outer ends of a harvester reel, where greater durability of the tines can be essential for successful operation.

The present invention arose from a desire to mount metal tines on the harvester reel bats disclosed in U.S. Pat. No. 3,796,030, which is hereby incorporated into this disclosure by reference. This improvement was designed to permit the user of such bats to selectively utilize metal tines when desired, without modifying the reel or existing bats.

BRIEF DESCRIPTION OF THE DRAWINGS

The invention is illustrated in the accompanying drawings, in which:

FIG. 3 is an exploded perspective view of the elements shown in FIG. 1;

FIG. 4 is a sectional view taken along line 4—4 in FIG. 1, at a reduced scale;

FIG. 5 is a side elevation view of a tine;

FIG. 6 is a front elevation view;

FIG. 7 is a top view of a bracket;

FIG. 8 is a side view;

FIG. 9 is a bottom view; and

FIG. 10 is an end view taken from the left in FIG. 7.

DETAILED DESCRIPTION OF THE PREFERRED EMBODIMENT

Figure 1:
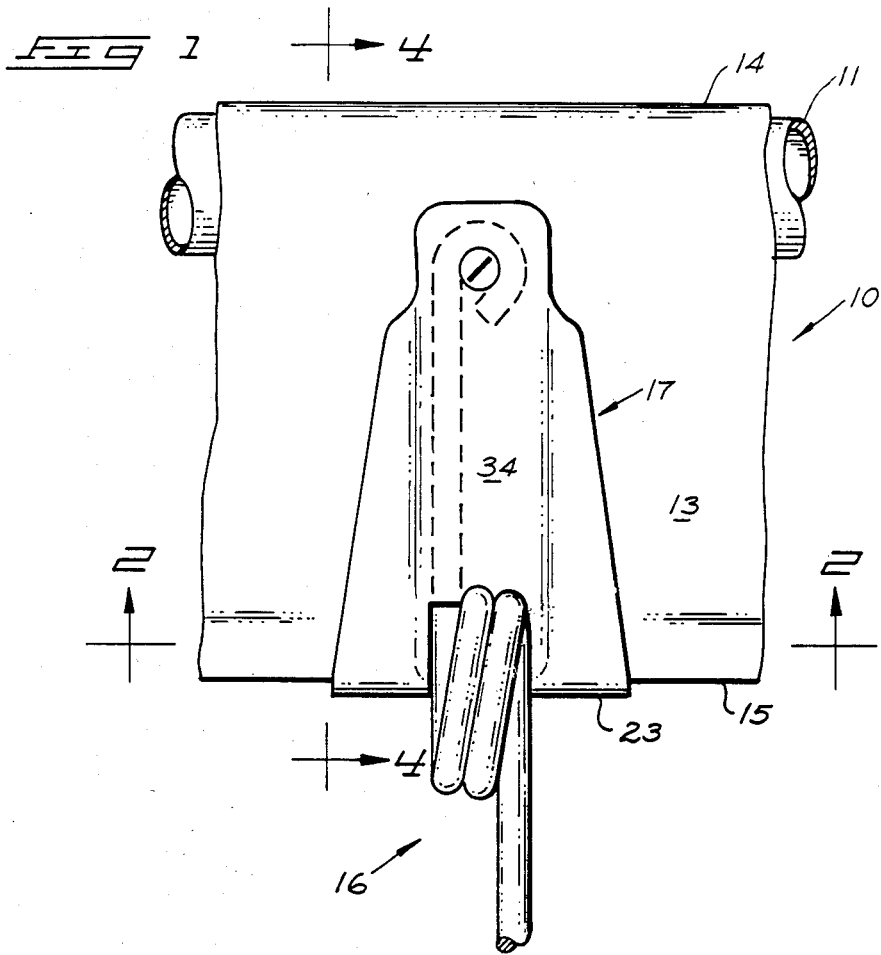
FIG. 1 is a fragmentary rear elevation view of the assembled bat and time.

In compliance with the constitutional purpose of the Patent Laws "to promote the progress of science and useful arts" (Article 1, Section 8), applicant submits the following disclosure of the invention.

This disclosure relates to a steel tine assembly that can be readily mounted on a tubular metal bat designed specifically for use with plastic tines. Since the bat structure itself is not substantially altered, the accompanying drawings illustrate only a short section of a typical bat, showing the manner by which the bat supports the novel tine assembly described herein.

The harvester bat 10 comprises a tubular metal structure that extends transversely across the supporting reel assembly (not shown). It is supported by an interior transverse shaft 11. Bat 10 has front and rear walls 12, 13 extending between top and bottom edges 14, 15. The top edge 14 of the bat 10 is arcuately wrapped over the interior shaft 11. The front and rear walls 12, 13 of the tubular bat 10 coverge downwardly in a teardrop configuration and abut one another along the bottom edge 15.

As used herein, the directional references "front" and "rear", shall refer to the direction of relative movement between the bat 10 and a growing field crop as the bat 10 engages the crop across the bottom of a harvester reel. This direction of movement is opposite to the direction of field movement of the machinery on which the harvester reel is supported.

The rear wall 13 of bat 10 is provided with a series of transversely spaced circular apertures 28 typically utilized for attaching plastic tines to the bat, as detailed in prior U.S. Pat. No. 3,796,030 which has been incorporated into this disclosure by reference. Since only a very short transverse section of bat 10 is illustrated in the accompanying drawings, only one such aperture is shown at a specific tine location. It is to be understood that numerous tine assemblies will normally be located across the bat 10, their spacing being dependent upon the nature of the crop to be harvested.

The metal tine assembly includes a steel wire tine 16 and a bent steel bracket 17. The tine is detailed in FIGS. 5 and 6. The bracket is detailed in FIGS. 7 through 10. Their assembly on bat 10 is shown in FIGS. 1 through 4.

The tine 16 is in the form of a wound spring coil 18 having a downwardly extending curved finger 20 bent in the direction of crop engagement. An upwardly extending shank 21 leads from the remaining side of the wound coil 18 and terminates in a substantially closed transverse loop 22.

The bracket 17 is adapted to cover the shank of the tine 16 and to overlie the rear wall 13 of bat 10. It includes a lower hooked lip 23 adapted to be fitted over the bottom edge 15 of the bat 10. It also is provided with an apertured upper end 24 adapted to be centered on the loop 22 at the upper end of the tine shank 21.

The tine assembly is completed by releasable fastening means that joins the apertured upper end 24 of bracket 17 to the loop 22 of the tine shank 21 and to the rear wall 13 of bat 10. This is shown as a metal screw 25 and a transversely slotted expandable grommet 26 which extend through the closed transverse loop 22 of the tine shank 21. They pass through the apertured upper end 24 of bracket 17 and the aperture 28 in the rear wall 13 of the bat 10 to clamp the upper ends of the bracket 17 and tine 16 against the bat 10. It is evident from FIG. 3 that the tine assembly can be readily mounted and dismounted from the bat 10 by manipulation of the single mounting screw 25.

Figure 2:
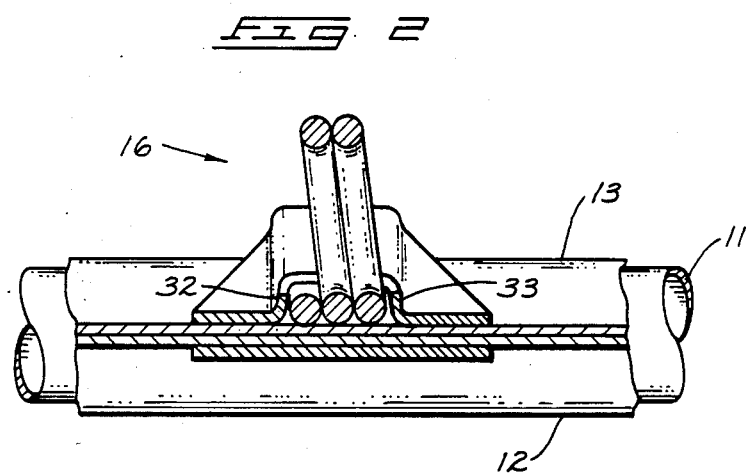
FIG. 2 is a fragmentary sectional view of the assembly as seen along line 2—2 in FIG. 1.

The bent shape of bracket 17 engages and fixably supports the shank 21 and wound coil 18 of the tine 16. As can be seen in FIGS. 1 and 2, the lower hooked lip 23 of the bracket 17 protrudes transversely outward beyond both sides of the wound coil 18. The coil is located within a rectangular opening 27 formed through the bracket 17. The axis of the wound coil 18 is substantially coplanar with the bottom edge 15 of bat 10, leaving the coil 18 freely suspended behind bat 10 to accommodate rearward flexing of the downwardly extending tine finger 20.

The opening 27 is defined by transversely spaced side edges 36, 37 abutting the opposite sides of the wound coil 18 at its junction with the tine finger 20 and shank 21, respectively. These side edges 36, 37 and their relationship to the tine coil 18 are best seen in FIGS. 1 and 2. Bracket 17 also presents an elongated recess 34 extending between the opening 27 and its apertured upper end 27. Recess 34 is defined by transversely spaced side walls 32, 33 at opposite sides of the tine shank 21. As shown by the phantom lines depicting the assembled position of shank 21 in FIG. 1, one side wall 32 of the elongated recess 34 is adapted to engage substantially the entire length of the tine shank 21 clamped between bracket 17 and the rear wall 13 of bat 10. The engagement provided by this elongated wall 32 and by the side edges 36 and 37 of opening 27 cooperatively prevent transverse movement of the tine shank 21 and coil 18 so that the upper end of tine 16 is rigidly connected to the bat 10 for conjoint movement about the supporting reel axis.

One important design aspect of the described tine assembly is the fact that the assembly of the metal tines on the bat 10 requires minimum physical interruption of the smooth outer surfaces presented to an engaged crop across the elongated front wall 12 of the bat 10. By mounting the physical structure of the metal tines 16 and bracket 17 almost entirely on the rear wall 13 of bat 10, the assembly minimizes the possibility of crop entanglement on the supporting tine structure.

The present improvement permits the user to readily interchange metal tines for plastic tines on a tubular bat structure as described. The assembly also facilitates replacement or repair of the metal tines 16 by merely releasing the supporting screw 25 to disengage the expandable grommet 16 and subsequently releasing the hooked lip 23 from the bottom edge 15 of the bat 10. Since the use of metal tines does not basically modify the bat structure itself, they can be used on a bat in conjunction with plastic tines. This is particularly helpful where metal tines can be mounted at the outer ends of the bat, where the pick-up tines on a harvester reel are typically subjected to the greatest wear and breakage during harvesting use.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

We claim:

1. A harvester bat and pick-up tine combination, comprising:

an elongated bat having front and rear walls extending between top and bottom edges of the bat; and a plurality of individual tine assemblies individually releasably mounted to the bat, with each individual tine assembly including:

a wire tine in the form of a coil wound about a central coil axis and having a downwardly extending finger leading from one side and an upwardly extending shank leading from its remaining side, said shank terminating in a closed transverse loop;

a bracket covering the shank of the tine and overlying the rear wall of the bat, said bracket including an apertured upper end centered on the closed transverse loop of the tine shank;

releasable fastening means extending through the closed transverse loop of the tine shank and the rear wall of the bat for clamping the upper end of the bracket and tine shank against the bat;

said bracket including a lower hooked lip releasably received over the bottom edge of the bat and extending longitudinally along the lower bat edge to releasably secure the bracket to the bat in cooperation with the fastening means; and retaining means on the bracket and engaging the tine for preventing motion of the tine shank in the plane of the rear bat wall, the retaining means including an opening in said bracket in which the coil of the tine is located with the coil axis coplanar with the bottom edge of the bat.

2. The combination of claim 1 wherein the front and rear walls of the bat converge downwardly and abut one another along said bottom edge and wherein the rear wall includes at least an aperture formed therein for each of said releasable fastening means.

3. The combination of claim 1 wherein the lower hooked lip of the bracket protrudes along the bottom bat edge from opposite sides of the wound coil of the tine.

4. The combination of claim 1 wherein the opening has spaced side edges abutting the opposite sides of the coil at its junctions with the tine finger and shank, respectively.

5. The combination of claim 1 wherein the opening has spaced side edges abutting the opposite sides of the coil at its junctions with the tine finger and shank, respectively;

said bracket presenting an elongated recess extending between said opening and the apertured upper end of the bracket defined by spaced side walls at opposite sides of the tine shank.

6. The combination of claim 5 wherein one side wall of the bracket abuts the tine shank.

7. A harvester pick-up tine assembly adapted to be mounted along an elongated harvester reel bat having front and rear walls extending between top and bottom edges, said tine assembly comprising:
- a wire tine in the form of a coil wound about a central coil axis and having a finger leading from one side and a shank leading from its remaining side, said shank terminating in a closed transverse loop;
- a bracket for covering the shank of the tine and adapted to overlie the rear wall of a supporting bat, said bracket including an apertured end to be centered on the closed transverse loop of the tine shank;
- releasable fastening means extending through the closed transverse loop of the tine shank and adapted to pass through the rear wall of the supporting bat for clamping the apertured end of the bracket and time shank against the supporting bat;
- said bracket including a hooked lip means adapted to be releasably fitted over the bottom edge of a supporting bat and further adapted to extend longitudinally along the bottom edge of the bat for releasably securing the bracket and tine to the bat in cooperation with the releasable fastening means; and
- retaining means on the bracket for engaging the tine shank to prevent the tine shank from movement on the bat in the plane of the rear bat wall, the retaining means including an opening in the bracket for receiving the coil of the tine for positioning the coil axis coplanar with the bottom edge of the bat.

8. The tine assembly of claim 7 wherein the hooked lip means of the bracket extends to opposite sides of the coil.

9. The tine assembly of claim 7 wherein the opening has spaced side edges for abutment with the opposite sides of the coil at its junctions with the tine finger and shank, respectively.

10. The tine assembly of claim 7 wherein the opening has spaced side edges for abutment with the opposite sides of the coil at its junctions with the tine finger and shank, respectively;
- said bracket presenting an elongated recess extending between said opening and the apertured upper end of the bracket said recess being defined by spaced side walls.

11. The tine assembly of claim 10 wherein at least one side wall of the tine shank receiving recess abuts the tine shank.

* * * * *